United States Patent [19]

Eckendorff

[11] 4,204,784
[45] May 27, 1980

[54] TOOLS FOR RECONDITIONING A VALVE SEAT IN A TAP

[76] Inventor: Jean-Pierre Eckendorff, 29, Avenue Aristide Briand, 27007 Evreux, France

[21] Appl. No.: 898,454

[22] Filed: Apr. 20, 1978

[30] Foreign Application Priority Data

Apr. 21, 1977 [FR] France .............................. 77 11989
Mar. 6, 1978 [FR] France .............................. 78 06274

[51] Int. Cl.² .............................................. B23C 3/05
[52] U.S. Cl. .................................... 408/83.5; 408/111
[58] Field of Search ................... 408/83.5, 80, 81, 82, 408/83, 110, 111, 709; 409/178; 90/12.5

[56] References Cited

U.S. PATENT DOCUMENTS

| 1,662,445 | 3/1928 | Troha ................................. 408/83.5 |
| 1,975,290 | 10/1934 | Rickets ............................. 409/175 X |

FOREIGN PATENT DOCUMENTS

307276  3/1929  United Kingdom .................... 90/12.5

Primary Examiner—Gil Weidenfeld
Attorney, Agent, or Firm—Charles E. Brown

[57] ABSTRACT

A tool kit for use in repairing a seat in a tap, the kit comprising an adaptor which can be mounted on a tap body, a guide member carried by the adaptor, tools each having a tool-carrier shaft or shank which can be rotatably mounted in the guide member, a means for driving a said shaft in rotation when mounted in the guide member, and a means for limiting the axial travel of the mounted tool, said adaptor having an end member forming a replica of the base portion of a tap head normally associated with said tap body, said end member having a screw-thread complementary to that of the body, and a support shoulder for bearing against the end face of said body.

20 Claims, 15 Drawing Figures

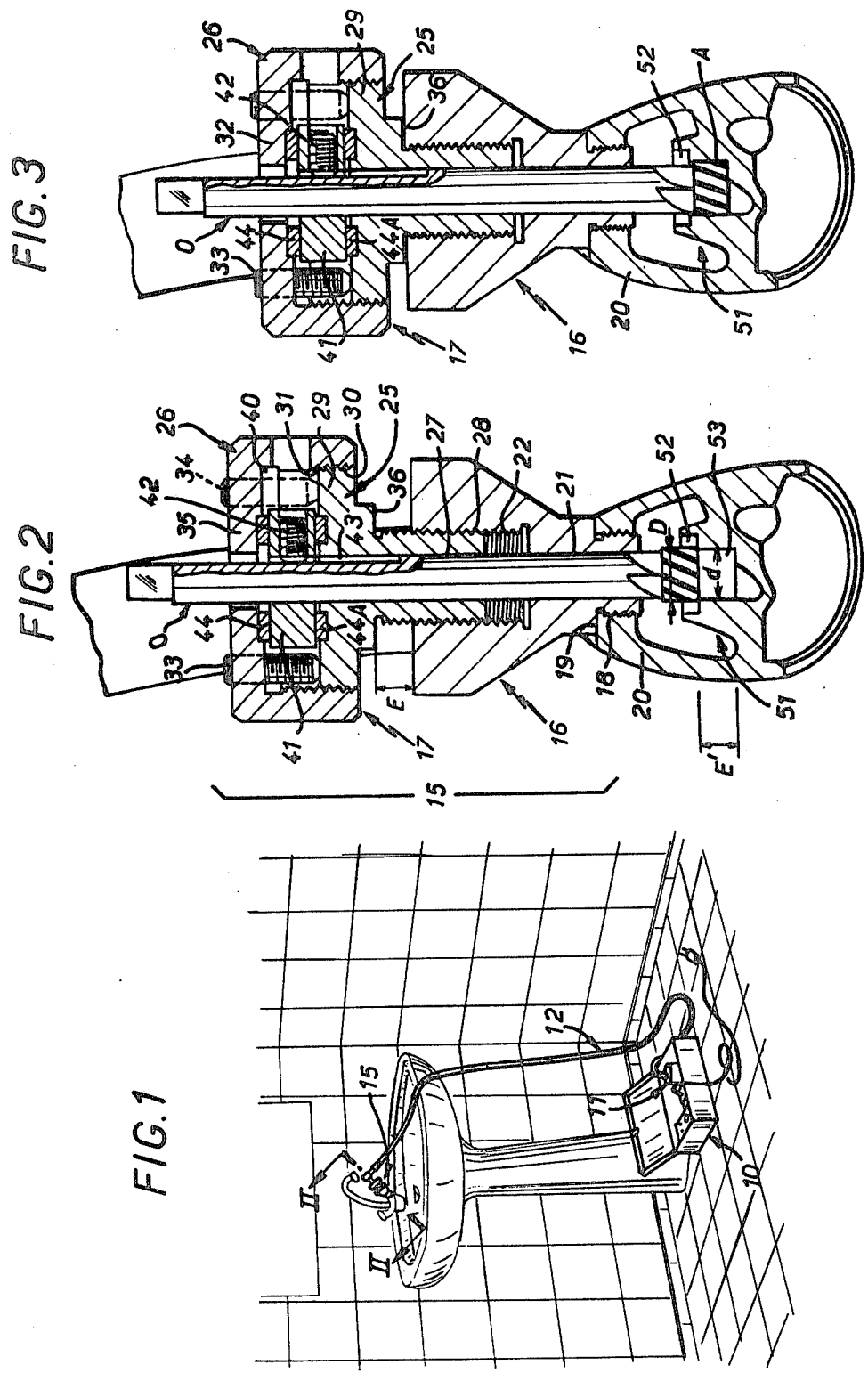
U.S. Patent   May 27, 1980   Sheet 1 of 4   4,204,784

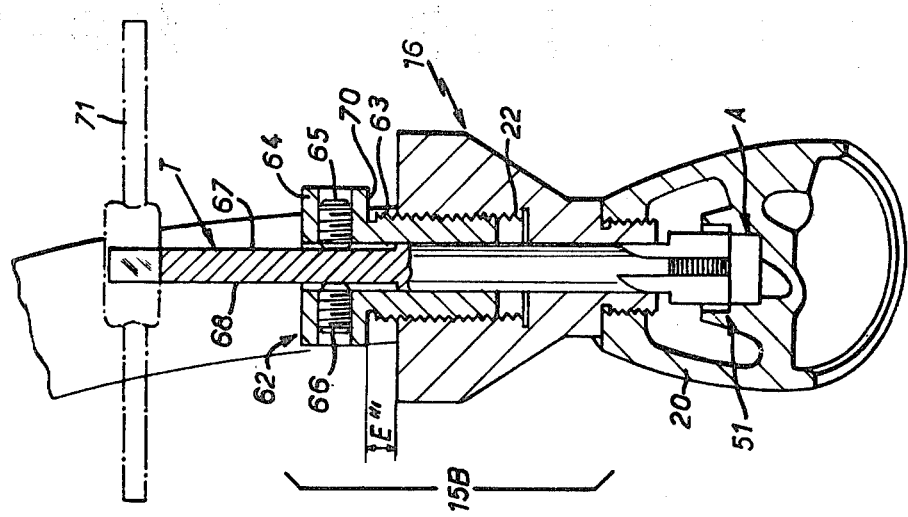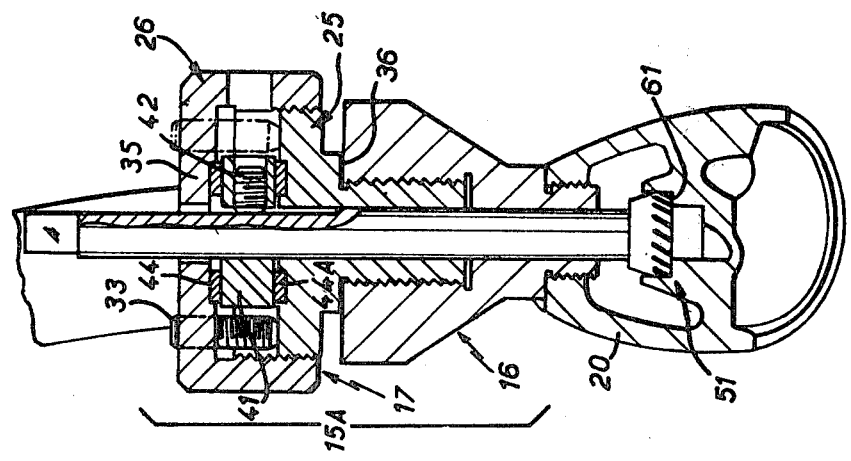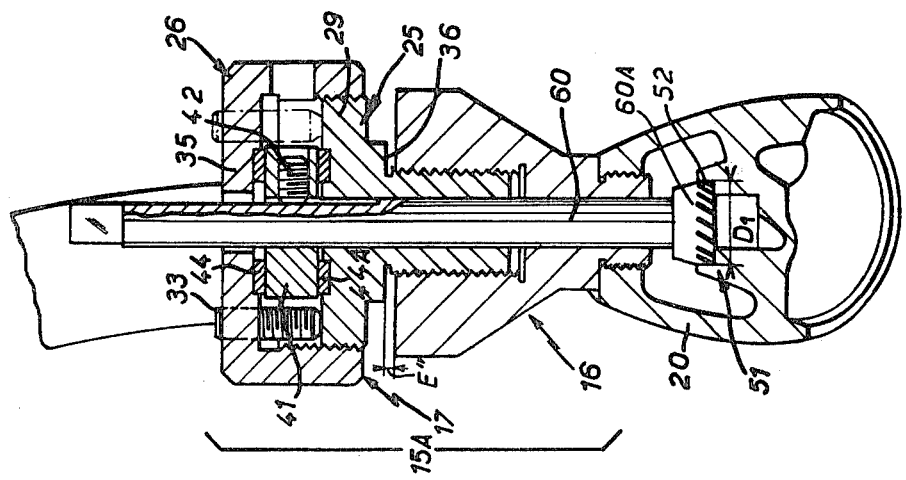

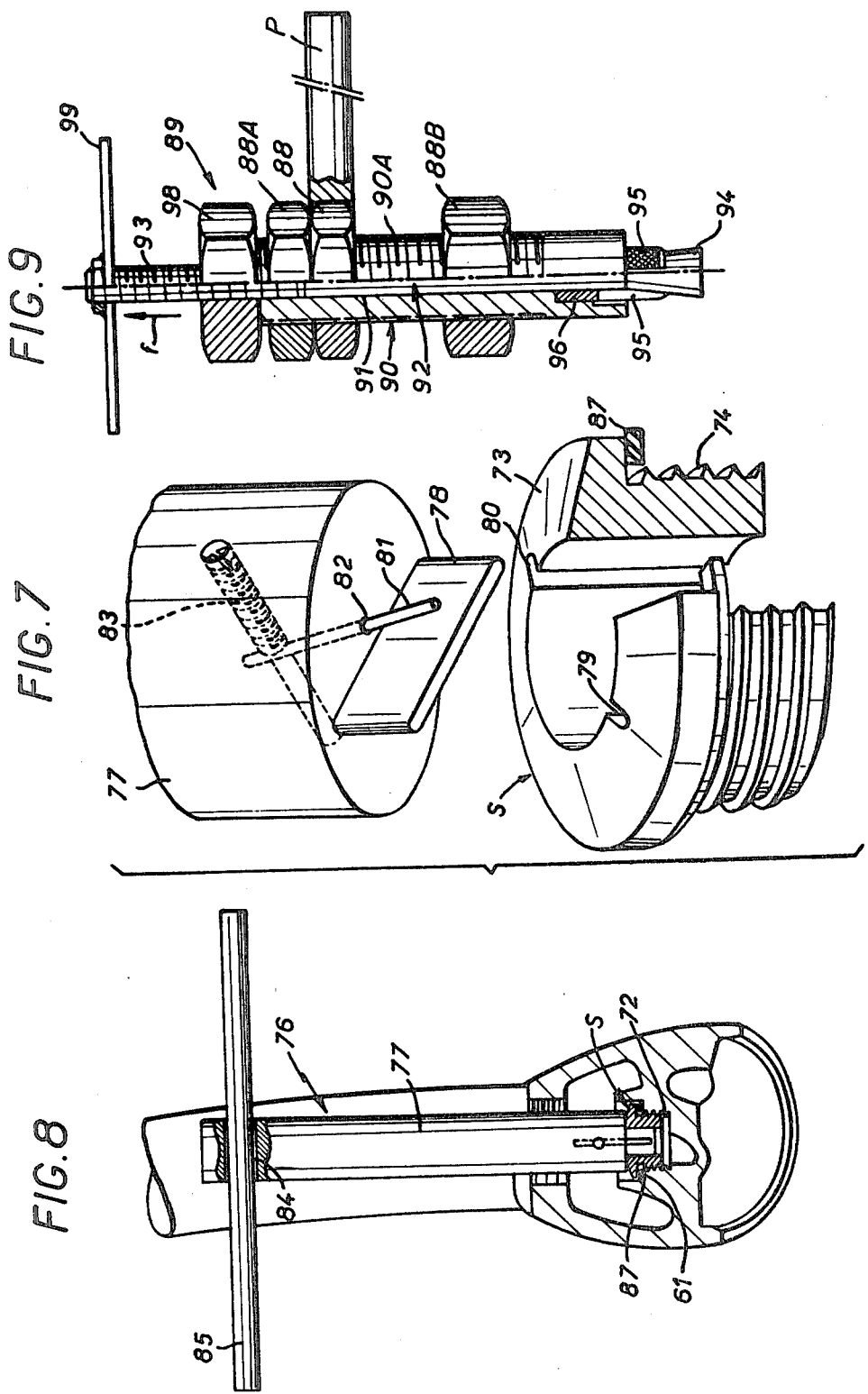

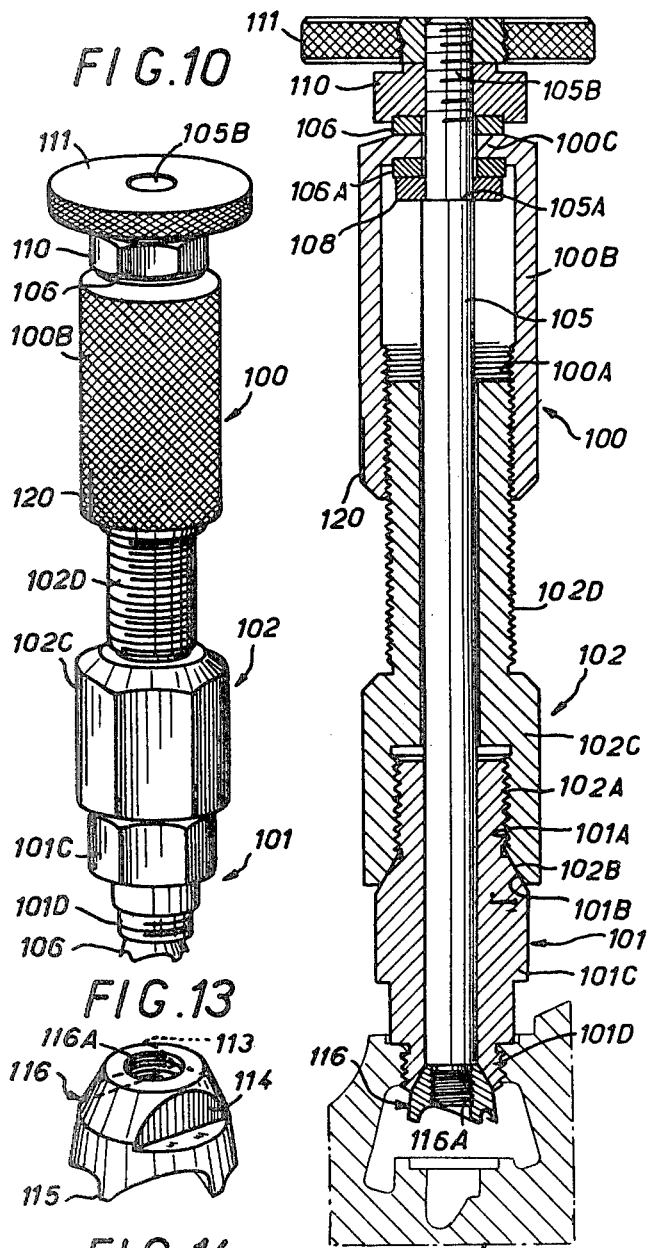

TOOLS FOR RECONDITIONING A VALVE SEAT IN A TAP

BACKGROUND OF THE INVENTION

The present invention relates generally to the tap art and concerns more particularly taps of the type in which the sealing action between the fluid inlet and the discharge is produced by a sealing joint provided on the tap head co-operating with a seat provided in the tap body.

In taps of this kind, when the seat, which is machined in the solid, is damaged and is no longer capable of effecting a seal, the repairer of the tap is faced with two solutions, either to grind the seat, or to incorporate a new seat into the body of the tap, after preparation of the tap body by successive machining operations.

The known state of the art is illustrated by U.S. Pat. No. 2,573,790 (H. Herzog) which describes apparatus, and the successive operations, for fitting a separate seat into the body of a tap, and by British Pat. No. 178684 (Taylor) which describes an apparatus for grinding a tap seat.

These prior apparatus which comprise three coaxial members (tool-carrier shaft, screw-threaded sleeve and adaptor) overcome the disadvantage of unacceptable insufficiency in respect of the guiding action, as the assembly rapidly suffers from play which detrimentally affects the quality of the seat produced.

In the above-quoted British patent, the apparatus described also suffers from the serious disadvantage that, without an axial restraint means, if the operator applies to the tool-carrier shaft a thrust force which is only a little higher than a threshold value compatible with the material to be machined, the tool 'bites' into the seat, producing imprints which it is then difficult or even impossible to remove.

Finally, the quality of the truing operation often leaves much to be desired by virtue of a limitation in regard to the amount of material which can be removed at a time without the danger of choking the tool, and by virtue also of an imperfect surface condition of the seat.

SUMMARY OF THE INVENTION

The present invention concerns a tool kit which makes it possible to repair taps as required by incorporating separate seats or by grinding, and which is free from the disadvantages set out hereinbefore.

According to the present invention there is provided a tool kit for use in repairing a seat in a tap, comprising: an adaptor which can be mounted on a tap body, a guide member carried by the adaptor, tools each having a tool-carrier shaft or shank which can be rotatably mounted in the guide member, a means for driving a said shaft in rotation when mounted in the guide member, and a means for limiting the axial travel of the mounted tool, said adaptor having an end member forming a replica of the base portion of a tap head normally associated with said tap body, said end member having a screw-thread complementary to that of the body, and a support shoulder for bearing against the end face of said body.

Such a tool assembly permits a tool carrier to be rigidly secured on the tap body because the adaptor is a precise replica of the tap head, the adaptor therefore screwing completely into the position of the tap head and abutting against the tap body.

In accordance with another feature of the invention, each tool (boring tool, milling tool, screw-cutting tool, etc.) is associated with a tool carrier, so that there are no operations of changing a tool for the different machining steps.

Perfect guiding of the tool is ensured in all cases, the tool advantageously comprising a rod-shaped shank, the rod being guided over virtually its entire length.

The guide also forms a means for axial displacement of the tool between an adjustable position at the beginning of its travel and a fixed position at the end of its travel, determining relative to the guide the position of the shank of the tool in the axial direction, while permitting it to rotate freely.

This arrangement makes it possible to control the travel of the tool between the two limit positions, the axial displacement of the tool being controlled manually.

The tool kit according to the invention makes the work of the operator remarkably easier and moreover avoids the dangers of incorrect operation, by virtue of employing mechanical drive means with a limited transmission torque, the operator only having to operate the means for axial displacement of the tool during a machining step.

The kit can also include a tool assembly for repairing a tap seat by grinding the seat, the tool assembly being characterised in that it comprises: a guide formed by a sleeve casing with an end portion and a skirt portion, said end portion forming a thrust bearing for the tool-carrier shaft which is secured by screwing to an operating wheel, while the skirt portion, whose length is at least equal to a predetermined depth of penetration of the tool, comprises, at its terminal portion remote from said casing end portion, a fixing and feed nut; a sleeve surmounting the end member of the adaptor, and carrying a screw-thread adapted to receive said nut and extending over a height which is at least equal to the length of the skirt portion, with its integrated nut.

The invention also provides a type of milling tool which is particularly well suited for the operation envisaged, characterised in particular by a small number of teeth which between them provide hollow, amply clear spaces; the resulting tool is advantageously further supplemented by a 90° bevelling tool.

Such a tool assembly, which it will be appreciated is of a simple construction, affords the advantage of ensuring that the tool does not 'bite' into the seat of the tap, as the degree of penetration of tool into the seat is perfectly controlled.

In addition, by virtue of the interchangeability of the end member, the tool assembly is capable of providing for repair of tap seats of any type whatever.

BRIEF DESCRIPTION OF THE DRAWINGS

Other features and advantages of the invention will be apparent from the following description given by way of example with reference to the accompanying drawings, in which:

FIG. 1 shows a diagrammatic perspective view of a tool carrier forming part of the kit according to the present invention in position on a tap, and the mechanical means for driving the tool;

FIG. 2 is a view on an enlarged scale and in longitudinal section in a plane through line II—II in FIG. 1; the tool, in this case a boring tool, being in the operative position, by virtue of the position of the guide;

FIG. 3 is a view similar to FIG. 2, showing the tool at the end of its downward travel movement, a bore then being formed in the tap body;

FIGS. 4 and 5 are views similar to FIGS. 2 and 3, in which a facing milling tool is associated with the tool carrier; FIG. 4 showing the beginning of the machining operation and FIG. 5 showing the end of the machining operation;

FIG. 6 shows a tool carrier provided with a screw-cutting tool;

FIG. 7 shows a perspective view of a separate seat, partly in cross-section, and also the lower end portion of a tool for positioning the separate seat in the tap body;

FIG. 8 shows an elevational view illustrating the fitting of a separate seat in the housing produced in the tap body;

FIG. 9 shows an elevational view, partly in cross-section, of a tool for extracting a seat inserted by crimping in a tap body;

FIG. 10 is a perspective view of a tool specifically intended for grinding a tap seat;

FIGS. 11 and 12 show views in axial section of a tool assembly, in two phases of grinding a tap seat;

FIGS. 13 and 14 are perspective views from above and from below of a milling tool for the above tool assembly; and FIG. 15 is a view in axial section of a bevelling tool.

DESCRIPTION OF THE PREFERRED EMBODIMENTS

The tool assembly according to the invention, for fitting a separate seat in a tap body, initially comprising a seat provided in the tap body, comprises, in a box 10, a direct-current electric motor-reducing unit 11 whose output shaft is connected to one end of a transmission member 12 of flexible cable type, the other end of which is intended to be connected to any tool mounted in a tool carrier described in detail hereinafter. This connection is advantageously of the dog-clutch type, adapted to provide for a limitation in the torque transmitted, by reason of the flexibility of the transmission member 12.

The tool carrier, denoted generally by reference 15 in FIG. 2, comprises a first member forming an adaptor 16, and, associated therewith, a second member 17 forming a guide.

The adaptor 16 has an end member forming a precise replica of the tap head, the end member comprising a screw-threaded portion 18 intended to be screw-threaded into the screw-thread provided in the tap body 20 for receiving the head of the tap, until the screw-threaded portion comes into abutment against a support surface 19; the head of the tap is not shown in FIG. 2, because the head of the tap must be removed for fitting the tool carrier 15 in position on the tap body 20.

The adaptor 16 has a smooth axial passage 21 followed by a screw-threaded bore 22 which opens at its other end.

The guide 17 associated with the adaptor 16 is formed by two associated members, 25 and 26 respectively.

A first member 25 forming a forward feed means has an axial passage 27 and a screw-threaded portion 28 intended to co-operate with the screw-threaded bore 22 of the adaptor 16; in its portion extending from the above-mentioned screw-threaded portion 28, the member 25 is enlarged to form a portion 29 which on its peripheral surface is provided with a screw-thread 30 for screwing it to the second member 26 which for this purpose has a corresponding screw-thread 31 so as to form a dismantleable assembly.

The two above-mentioned members 25 and 26 are advantageously non-rotatably secured together by means of two diametrically opposed screws 33 and 34 which are screw-threaded into an end wall 35 of the member 26 and which bear against the corresponding end face of the portion 29.

The member 25 also comprises a circular bearing surface 36 which is provided between the portion 29 and the screw-threaded portion 28, the purpose of this bearing surface 36 will be apparent from the following description of the mode of operation of the tool assembly.

Provided between the portion 29 of the member 25 and the end portion 35 of the member 26 is a space 40 in which there is inserted a thrust bearing capable of producing axial movement of the shank of the tool, indicated generally by 'O', while permitting free rotation of the tool shank; the thrust bearing in the embodiment illustrated comprises an abutment in the form of a disc 41 which is secured to the shank 'O' of the tool by a radial screw 42 engaging into a longitudinal groove 43 provided for this purpose in the tool shank 'O', in such a way that the axial position of the tool is adjustable by slackening the screw 42 and re-tightening it after adjustment, and also two friction members 44 and 44A which are interposed on the one hand between a face of the abutment 41 and the corresponding face of the portion 29 and, on the other hand, between the other face of the abutment 41 and the end portion 35 of the member 26.

Such an arrangement therefore affords the following possibilities:

The tool shank 'O', in this case, a milling tool which is in one piece with the tool shank, may be displaced longitudinally in the tool carrier formed as described above;

The tool is held without axial play in the tool carrier, by the thrust bearing;

Good guiding for the tool shank is ensured, as the tool shank is held over the major part of its length by the adaptor 16 and the member 25 which forms the forward feed means;

Free rotation of the tool in the tool carrier;

Permitting forward feed movement or retraction movement of the tool which is controlled manually.

In FIG. 2, the assembly of the tool carrier 15 with the tool shank 'O' is secured to the body 20 of the tap, by the adaptor 16 which is screwed into the screw-thread 18 normally intended to receive the head of the tap.

Provided in the body 20 of the tap is a seat which is indicated generally at 51 and which is an integral part of the tap body 20. The seat has a recess 52 forming a seat bearing surface, provided facing a liquid flow passage 53. To restore such a seat which has suffered damage and which is therefore no longer capable of sealing off the flow of liquid, the tool carrier 15 with its tool 'O', which is not axially locked, is set in place on the tap body 20 by bringing the bearing face 19 of the adaptor 16 into contact with the tap body 20; at this stage therefore the cutting end of the tool normally rests on the edge formed between the recess 52 and the passage 53, the diameter D of the cutting part of the tool corresponding to the central core portion of the screw-cutting tool and being slightly greater than the diameter of the passage 53.

By rotating the guide 17, by manually screwing or unscrewing, the desired travel of the tool is then adjusted, the length of such travel being determined by the distance E between the bearing surface 36 and the upper facing surface of the adaptor 16.

After adjustment of the tool travel to a value which is at most equal to the height E' of the passage 53, the abutment 41 is secured to the tool shank by screwing the screw 42.

The free end of the flexible cable 12 is then connected to the upper part of the tool shank 'O' and the motor-reducing unit 11 can be set in operation, which causes the tool shank 'O' to be driven in rotation; the tool thus turns in the tool carrier 15 without axial displacement, by virtue of the arrangement of the thrust bearing in the space 40.

The operator then only has to rotate the guide 17 manually, thus providing for axial displacement of the tool whose operative end portion cuts a bore A (FIG. 3) in the passage 53. This operation is continued until the moment at which the face 36 of the forward feed means 25 comes into contact with the adaptor 16.

The tool is firmly held throughout the machining operation, thus making it possible to produce a bore with very close tolerances.

This operation being concluded, the tool carrier and its tool are removed from the bore A made as described above, by unscrewing the adaptor 16 after disconnecting the flexible cable 12.

The following phase (FIGS. 4 and 5) comprises effecting a facing operation for the recess 52 forming the seat bearing surface.

For this purpose, another tool carrier 15A is set in place on the tap body, which tool carrier 15A is in all respects similar to that which was used for making the above-mentioned bore, but which carries a facing tool comprising a shank 60 and a cutting tool 60A forming a one-piece assembly; the cutting diameter D1 of the tool 60A is such (FIG. 4) that the cutting portion engages into the above-mentioned recess 52, while resting on the seat bearing surface.

The travel of the tool is then adjusted by means of the guide 17, so as to form a space E" corresponding to the desired travel, between the guide 17 and the adaptor 16; the milling tool is then connected to the flexible cable 12 for driving it in rotation, whereupon the milling tool 60 is fed forwardly as in the above-described operation, by manual rotation of the guide 17, until the forward feed means 25 bears against the adaptor 16, the facing operation (FIG. 5) then being concluded; a seat bearing surface 61 is thus formed in the body 20 of the tap.

The following operation (FIG. 6) comprises cutting a thread in the above-mentioned bore A.

To do this, the tool carrier 15A is replaced by a tool carrier 15B (FIG. 6) which comprises a forward feed means 62 formed by a one-piece member having a screw-threaded portion 63 which is screwed into the screw-thread 22 of an adaptor 16 similar to the adaptors described above, and whose pitch is identical to that of the screw-cutting tool.

Beyond the screw-threaded portion 63, the forward feed means 62 comprises a head 64 carrying two diametrically extending screws 65 and 66 which are intended to secure the forward feed means to the screw-cutting tool T, by co-operating with corresponding flats 67 and 68 provided longitudinally on the shank of the tool T.

Between the screw-thread 63 and the head 64, the forward feed means comprises an annular bearing surface 70.

Adjustment of the travel of the screw-cutting tool is effected by resting the cutting end of the tool on the upper edge of the bore A, then screwing or unscrewing the forward feed means 62 until the bearing surface 70 is spaced from the corresponding face of the adaptor by a desired value D'''; it will be appreciated that the forward feed means is not secured to the screw-cutting tool T, for these adjustment operations.

Once the travel of the tool has been adjusted, the forward feed means is secured to the tool by means of the screws 65 and 66, and the tool can be driven in rotation manually by means of a bar 71 which is fitted to its free end, thus resulting in the formation of a screw-thread 72 (FIG. 8) in the bore A.

As the operation of preparing the housing 20 is concluded at that moment, a separate seat 'S', as shown in FIG. 7, is set in position, the seat having a bearing surface 73 and a screw-threaded portion 74 capable of being screwed into the screw-thread 72 formed in the body 20 of the tap.

The seat 'S' is fitted into the tap body 20 by means of a tool indicated generally at 76 and comprising a stem 77 which at one end has a blade 78 intended to co-operate with two corresponding longitudinally extending grooves 80 provided in the seat 'S'.

For the purposes of being inserted into the body 20 of the tap, the seat 'S' must be held at the end of the tool 76; for this purpose, the tool 76 comprises, opposite one face of the blade 78, a thread-like piano wire member 81 which extends obliquely relative to the axis of the stem 77 and which has an end portion engaged in a bore 82 provided in the stem, in which it is held by a radially extending screw 83. The seat 'S' can be held at the end of the tool 76 by this arrangement, thus making it easier for the seat to be inserted into the tap body 20.

At its other end the stem 77 has a passage 84 for receiving a bar 85 forming an operating lever.

A flat joint 87 (FIG. 7) is interposed between the separate seat 'S' and the seat bearing surface 61, in order to form a seal between these two components.

When the seat 'S' has thus been fitted into place in the tap body 20, the operator then replaces the tap head on the tap body in the usual way.

In the foregoing description, the different operations of boring, facing and screw-cutting are effected by means of a tool carrier whose tools remain in place on the tool carriers. However, it will be readily apparent that a single tool carrier could be provided for the boring and facing operations, simply by inserting a facing milling tool in the tool carrier, instead of the boring tool, after the boring operation has been effected.

It is easy to provide a set of adaptors 16 adapted to the usual screw-threads of the various types of taps, in the box 10 of the tool assembly.

Within the scope of the present invention, the tool assembly is advantageously completed by an extractor as shown in FIG. 9 and denoted generally by reference 89; such an extractor is more particularly intended for extracting a damaged seat which has been fitted by crimping in a tap body.

The extractor comprises a sleeve 90 with an axial passage 91 in which there is disposed, except for operating clearances, a spindle 92 whose end parts project from the respective ends of the sleeve, one of the end parts of the spindle comprising a screw-threaded portion 93 and the other being of a general frusto-conical shape 94 intended to co-operate with jaws 95 with external milled surfaces, which are provided in a member 96 held in the sleeve.

The screw-threaded portion 93 of the spindle 92 carries a nut 98 and a member 99, while the sleeve 90 which is screw-threaded externally at 90A, receives a gripping handle P which is coupled to the sleeve by a nut 88 and a keeper locking nut 88A in a selected position; the sleeve also carries an extraction nut 88B.

To extract a damaged crimped seat from a tap body, the lower end of the tool, that is to say, the part in which the spindle has the frusto-conical surface 94, is engaged within the tap body, by resting the corresponding end of the sleeve 90 against the seat (not shown).

During this operation, it is necessary to ensure that the extraction nut 104 does not touch the screw-threaded portion intended to receive the tap head.

At this moment, the jaws 95 are engaged in the seat and are caused to expand by operating the nut 98, providing for axial displacement (in the direction of arrow f) of the spindle which, by virtue of its frusto-conical surface 94, spreads the jaws 95 apart.

The extractor is then secured to the seat to be extracted.

The extraction nut 104 is then screwed and, by bearing against the body of the tap, produces extraction of the damaged seat, the tool being held by the gripping handle P.

According to the invention, there is also provided a tool assembly for repairing a tap solely by grinding the seat of the tap, such tool assembly being shown in FIGS. 10 to 15 and comprising: a guide 100 in the form of a sleeve casing associated with an adaptor comprising an end member 10 surmounted by a sleeve 102, the end member having an end portion forming a replica of the tap head which is normally associated with the tap body CR.

The end member 101 and the sleeve 102 are assembled by screwing; for this purpose, at the end remote from that at which it is intended to be secured to the tap body, the end member has a screw-thread 101A arranged to co-operate with a nut 102A provided in the sleeve 102.

So that the two members set out above are perfectly aligned axially, the end portion of the sleeve 102 which is screwed on to the end member 101 comprises a frusto-conical bearing surface 102B arranged to co-operate with a complementary surface 101B provided on the end member.

In order to facilitate connection of the end member 101 to the sleeve 102, these two members are made from hexagonal bars, so that they each comprise a hexagonal portion as indicated at 101C and 102C.

In its portion which extends from the hexagonal portion 102C, the sleeve is externally screw-threaded at 102D; the sleeve casing 100 is screwed on to this external screw-threading, for which purpose the sleeve 100 comprises a nut-forming screw-thread 100A formed internally in a skirt portion 100B; the sleeve casing 100 also comprises an end portion 100C.

The end portion 100C of the sleeve casing forms a thrust bearing for a tool-carrier shaft 105 which is provided, at the end towards the end member of the adaptor, with a tool such as a milling tool 106, while, at its other end, the tool carrier 105 is axially fixed to the end portion 100C of the sleeve casing 100.

The above-mentioned thrust bearing is formed by two friction washers 106 and 106A which are disposed respectively on each face of the end portion 100C of the sleeve casing; the washer which is disposed on the internal face is advantageously engaged and wedged in a recess provided for this purpose in the end portion of the sleeve casing, and it is in contact with a bearing washer 108 which bears against a shoulder 105A provided on the sleeve-carrier shaft 105. A nut 110 which is screwed on to a screw-thread 105B of the tool-carrier shaft 105 axially connects the tool-carrier shaft 105 to the sleeve casing, while an operating wheel 111 screwed on to the above-mentioned screw-thread 105B forms at the same time a locking nut for the nut 110.

The tool 116 (FIGS. 13 and 14 in particular) is a milling tool which is fitted by screwing on to the end of the tool-carrier shaft; to facilitate fitting the milling tool on to the tool-carrier shaft, the tool comprises two axially opposed flat surfaces 113 and 114 while its end face comprises a restricted number of cutting teeth, at 115 for example four radial teeth, which are distributed regularly around a central bore 116A. The side face of the milling tool has a relief taper of about 5 degrees.

The end member 101 is bored so as to ensure stability of the tool-carrier shaft 105, while the sleeve 102 is bored so as to provide clearance for the tool-carrier shaft, so that the tool-carrier shaft 105 is guided in the vicinity of the tool, while the rotary actuation thereof is effected at the other end of the device.

A set of end members 101 is provided in such a way as to permit grinding of the seat of any type of tap, by fitting into position an end member which is suited to the particular type of tap.

Moreover, at their end which forms the replica of the tap head, the end members 101 are provided with a flared opening 101D which is intended to permit the tool to be at least partially retracted into the end member, in such a way that the cutting end face of the tool 116 can be in a position of maximum retraction which is very close to the end of the end member.

Such an arrangement is particularly advantageous when, depending on the types of tap, the seat of the tap is close to the orifice provided in the tap body for receiving the tap head.

In contrast, when the tap seat is remote from the above-mentioned orifice, the length of the screw-thread 102D of the sleeve 102 and the length of the sleeve casing 100 are such that in every case the tool-carrier shaft 105 can be brought close to contact with the seat for grinding the seat.

It will also be noted that, even in the case of maximum retraction of the tool-carrier (FIG. 11), the nut 100A of the sleeve casing is engaged with the screw-thread 102D of the sleeve 102 by a plurality of screw-threads, thus ensuring perfect alignment of the sleeve casing with the sleeve.

When he wishes to grind a tap seat, the operator fits to the sleeve 102 an end member which is suited to the type of tap if the end member in position is not suitable, this being effected after the tool 116 has been removed; the tool is re-fitted, and the tool-carrier shaft is moved into its limit retraction position. The apparatus which has been prepared in this way is fixed to the tap body CR by means of the end member 101, then the tool-carrier shaft 105 is advanced axially towards the tap seat by means of the sleeve casing 100, which forms a forward feed means, until the cutting face of the tool 116 comes into contact with the tap seat; at this stage, the sleeve casing 100 and the operating wheel 111 are simultaneously driven in rotation, the angular speed of the sleeve casing being slow while the angular speed imparted to the operating wheel may be substantially higher.

Axial displacement of the tool carrier 105 and consequently the tool 116 can be monitored by means of a marker 120 provided on the outside of the skirt portion of the sleeve casing.

The operator knows that the pitch of the screw-thread 102D of the sleeve is for example 100, and that the sleeve is fixed against rotation, so, if the operator rotates the sleeve through 180° from the moment at which the tool 116 is in contact with the seat to be ground, the forward feed movement of the tool, for such an angular displacement of the marker 120, will be one half pitch, that is to say, 5/10 mm, which is generally amply sufficient to renovate the surface condition of the seat of the tap; however, this operation can be continued if this is found necessary after checking.

The substantial hollow space provided between the teeth 115 avoids any danger of the tool becoming choked, and the seat being scored, these being disadvantages which are often encountered with the milling tools of the prior art; indeed, such tools are found to have teeth which are very close together and which are not individually machined, so that they make it possible to remove only a very small amount of material at a time. The hollow space provided between the teeth 115 affords a relief clearance whose height is an order of magnitude greater than that of the depths of tool penetration envisaged.

To conclude the operation, there is finally provided a bevelling tool of the kind diagrammatically shown in FIG. 15. This tool comprises an upper portion 117 similar to that of a normal milling tool 116 of FIGS. 13 and 14, and a lower portion 118 in the form of a 90° inverted cone, also with four teeth (not shown). Using this chamferring milling tool makes it possible to remove the sharp angle which may have been formed following the operation of grinding the seat, at the inside edge thereof. This additional operation is very useful as the edge formed by the sharp angle which is removed by this operation has a particular cutting action; this therefore prevents rapid damage to the rubber valve members by punching, shearing and tearing.

It will be understood that the invention is not limited to the selected embodiment which on the contrary may be modified without thereby departing from the scope of the present invention as defined in the appended claims.

I claim:

1. A tool assembly for use in repairing a seat of a tap, said tool assembly comprising an adaptor for mounting on a tap body to be repaired, said adaptor having a threaded end portion complementary to that of the tap body to be repaired and a support shoulder for axial bearing against an end face of the tap body, said adaptor having a central bore, a guide member in threaded engagement relative to said adaptor, said guide member having a central bore in alignment with said adaptor central bore, a tool shank having a cutting end and being receivable in said bores and guided radially without play along the axial length of said adaptor, means for securing said guide member at a selected axial position along said tool shank, rotatable mounting means mounting said tool shank relative to said guide member, thrust bearing means cooperating with said rotatable mounting means and said guide means for ensuring axial abutment without play of said tool shank in each of two axial directions of said tool shank relative to said guide member, whereby said guide member is operable to feed said tool shank for working on a tap seat while the cutting end of said tool shank is positively positioned relative to said adaptor at all times.

2. A tool assembly according to claim 1, wherein the cutting end of said tool shank comprises a boring tool.

3. A tool assembly according to claim 1, wherein the cutting end of said tool shank comprises a facing milling tool.

4. A tool assembly according to claim 1, wherein the cutting end of said tool shank comprises screw-cutting tool.

5. A tool assembly according to claim 1, wherein there are cooperable shoulders on said guide member and said adaptor for determining the end of travel of said tool shank.

6. A tool assembly according to claim 1, wherein said thrust bearing means include a two-way thrust bearing disposed in said guide member.

7. A tool assembly according to claim 6 wherein said guide member includes a sleeve having an enlarged upper part and an end wall having a depending skirt in threaded engagement with said sleeve, a chamber being defined by said sleeve and said end wall with its depending skirt for accommodating said thrust bearing.

8. A tool assembly according to claim 7, wherein said means for rotatably mounting said tool shank in said guide member comprises a disc accomodated in said chamber having a central passage for said tool shank, and said means for securing said guide member at a selected axial position along said tool shank includes means securing said disc to said tool shank.

9. A tool assembly according to claim 8, wherein said means securing said disc to said tool shank comprises a radial screw, and said thrust bearing means being defined in said guide member by friction washers interposed respectively between said disc and said end wall and said disc and said sleeve.

10. A tool assembly according to claim 8, wherein said threaded engagement securing said end wall and its depending skirt to said sleeve define means for taking up axial play therebetween, and there are means for locking said end wall and said sleeve for rotation with each other.

11. A tool assembly according to claim 10, where the end of said tool shank remote from said cutting end have means for manual rotation together including an axially symmetrical operating member.

12. A tool assembly according to claim 1, together with means on the end of said tool shank remote from said cutting end for coupling to an electric motor-speed reducing unit.

13. A tool assembly according to claim 1, wherein said guide member comprises a sleeve casing including an end portion and a skirt portion, said thrust bearing means being formed on said end portion, the skirt portion being at least as long as the desired travel of said tool shank, said adaptor further comprising a sleeve threadedly engageable at one end in said skirt portion at its opposite end in said adaptor, and an operating wheel threadedly engaged on the end of said tool shank remote from its cutting end.

14. A tool assembly according to claim 13, wherein said thrust bearing means comprises a support washer bearing against a shoulder provided on said tool shank, a first friction washer interposed between said support washer and the inside of said sleeve casing end portion, a second friction washer in contact with the outside of said end portion, a clamping nut screwed on to said other end of said operating shank, said operating wheel forming a keeper nut.

15. A tool assembly according to claim 14, wherein said guide member comprises a marker on its outside for indicating the forward feed movement of said tool shank, the displacement of the marker being determined by the angular displacement of the guide member and the pitch of the threads between said sleeve and said adaptor.

16. A tool assembly according to claim 13, wherein said guide member comprises a marker on its outside for indicating the forward feed movement of said tool shank, the displacement of the marker being determined by the angular displacement of the guide member and the pitch of the threads between said sleeve adn said adaptor.

17. A tool assembly according to claim 14, wherein said adaptor and said sleeve have complementary frusto-concial bearing surface portions respectively on the outside of said adaptor and the inside of said sleeve.

18. A tool assembly according to claim 13, wherein said bore in said adaptor extends along the entire axial length of said adaptor, said bore in said sleeve defining radial play with said tool shank.

19. A tool assembly according to claim 13, wherein said adaptor comprises a polygonal outer section adjacent a polygonal outer section on said sleeve.

20. A tool assembly according to claim 13, said cutting end of said tool shank defining a milling tool comprising several uniformly spaced radial cutting teeth in annular array the depth of the intertooth spaces being greater than the desired maximum depth of cut.

* * * * *